United States Patent
Amuduri (10) Patent No.: US 10,497,192 B2
(45) Date of Patent: Dec. 3, 2019

(54) NOTIFYING AN INDIVIDUAL ABOUT AN ITEM IN A SECURE MAILBOX

(71) Applicant: CARRIER CORPORATION, Palm Beach Gardens, FL (US)

(72) Inventor: Santhosh Amuduri, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/008,288

(22) Filed: Jun. 14, 2018

(65) Prior Publication Data

US 2019/0318557 A1 Oct. 17, 2019

(30) Foreign Application Priority Data

Apr. 16, 2018 (IN) .............................. 201811014440

(51) Int. Cl.
*G07C 9/00* (2006.01)
*G06Q 50/12* (2012.01)
(Continued)

(52) U.S. Cl.
CPC ..... *G07C 9/00103* (2013.01); *A47G 29/1225* (2013.01); *A47G 29/141* (2013.01);
(Continued)

(58) Field of Classification Search
CPC ............. G06Q 10/0836; G06K 7/1417; G06K 7/10415; G06K 19/0723; A47G 29/141;
(Continued)

(56) References Cited

U.S. PATENT DOCUMENTS

| | | | |
|---|---|---|---|
| 6,974,928 B2 * | 12/2005 | Bloom | B07C 3/00 209/583 |
| 7,885,903 B2 * | 2/2011 | Mayer | G07F 17/26 705/408 |

(Continued)

FOREIGN PATENT DOCUMENTS

| | | |
|---|---|---|
| CN | 202168717 U | 3/2012 |
| EP | 2524632 A1 | 11/2012 |

(Continued)

OTHER PUBLICATIONS

Daniel, "uCella Smart Package & Delivery Mailbox Tracks and Receives Your Packages" Nov. 27, 2015, 6 pages.

(Continued)

*Primary Examiner* — Hoi C Lau
(74) *Attorney, Agent, or Firm* — Cantor Colburn LLP (57) ABSTRACT

A method of notifying an individual about an item in a secure mailbox is provided. The method includes receiving an indication that an item for an intended recipient has been deposited into a secure mailbox. The method also includes, based at least in part on receiving the indication, programming an access control device of the secure mailbox to unlock the access control device in response to a credential assigned to the intended recipient and notifying the intended recipient that the item is in the secure mailbox. It is detected that the secure mailbox has been unlocked in response to the credential that is assigned to the intended recipient. Based at least in part on the detecting, re-programming the access control device of the secure mailbox to an un-programed status that includes the access control device remaining in the unlocked state.

16 Claims, 3 Drawing Sheets

(51) Int. Cl.
*G06Q 10/08* (2012.01)
*A47G 29/14* (2006.01)
*A47G 29/122* (2006.01)

(52) U.S. Cl.
CPC ......... *G06Q 10/0836* (2013.01); *G06Q 50/12* (2013.01); *A47G 2029/1226* (2013.01); *A47G 2029/149* (2013.01); *G07C 9/00904* (2013.01); *G07C 2009/00769* (2013.01)

(58) Field of Classification Search
CPC ........ A47G 29/1225; A47G 2029/1226; A47G 2029/149; G07C 9/00103; G07C 9/00769
See application file for complete search history.

(56) References Cited

U.S. PATENT DOCUMENTS

| | | | |
|---|---|---|---|
| 8,655,795 B1 | 2/2014 | Kolchin | |
| 9,158,946 B2 | 10/2015 | Amdahl et al. | |
| 9,619,955 B2 | 4/2017 | Eichenblatt | |
| 10,043,151 B1* | 8/2018 | Zhu | G06Q 10/0836 |
| 2005/0247771 A1* | 11/2005 | Engel | A47G 29/1209 232/27 |
| 2006/0020366 A1* | 1/2006 | Bloom | B07C 3/00 700/226 |
| 2006/0253405 A1* | 11/2006 | Nirenberg | G06Q 50/32 705/401 |
| 2007/0296579 A1* | 12/2007 | Mayer | G07F 17/12 340/567 |
| 2008/0040243 A1* | 2/2008 | Chang | G06Q 10/00 705/28 |
| 2009/0319284 A1* | 12/2009 | Mayer | G07B 17/00024 705/1.1 |
| 2010/0004960 A1* | 1/2010 | Frankenberg | G06Q 10/02 705/5 |
| 2011/0062666 A1* | 3/2011 | Castineiras | A63F 9/18 273/293 |
| 2012/0024024 A1* | 2/2012 | Faber | G07C 9/00015 70/278.1 |
| 2012/0062362 A1* | 3/2012 | Rudduck | G06Q 10/083 340/5.64 |
| 2012/0235786 A1* | 9/2012 | Rudduck | G06Q 10/083 340/5.54 |
| 2013/0088323 A1* | 4/2013 | Ryan | G06Q 10/08 340/5.7 |
| 2013/0241694 A1* | 9/2013 | Sharma | G08C 17/02 340/5.64 |
| 2014/0035721 A1* | 2/2014 | Heppe | G07C 9/00912 340/5.54 |
| 2014/0258168 A1* | 9/2014 | Crawford | G06Q 10/0836 705/339 |
| 2015/0108209 A1* | 4/2015 | Cho | A47G 29/1212 232/34 |
| 2015/0120602 A1* | 4/2015 | Huffman | G06Q 10/083 705/339 |
| 2015/0186840 A1* | 7/2015 | Torres | A47B 81/00 705/339 |
| 2015/0356801 A1* | 12/2015 | Nitu | G07C 9/00912 340/5.61 |
| 2015/0359372 A1 | 12/2015 | Cho et al. | |
| 2016/0025549 A1* | 1/2016 | Motoyama | G01G 19/414 177/1 |
| 2016/0027261 A1* | 1/2016 | Motoyama | G06Q 10/04 340/313 |
| 2016/0066733 A1* | 3/2016 | Gozar | A47G 29/141 232/18 |
| 2016/0216106 A1* | 7/2016 | Motoyama | G01B 11/28 |
| 2016/0235236 A1* | 8/2016 | Byers | A47G 29/14 |
| 2016/0278558 A1 | 9/2016 | Ansari | |
| 2016/0374494 A1* | 12/2016 | Geng | A47G 29/141 232/17 |
| 2017/0091710 A1 | 3/2017 | Van Dyke | |
| 2017/0132691 A1* | 5/2017 | Wiechers | G06Q 10/0833 |
| 2017/0287244 A1* | 10/2017 | Jansen | A47G 29/141 |
| 2018/0121873 A1* | 5/2018 | Walsh | G06Q 10/0836 |
| 2018/0365641 A1* | 12/2018 | Zhu | G06Q 10/0836 |
| 2018/0365643 A1* | 12/2018 | Zhu | G06K 19/06037 |

FOREIGN PATENT DOCUMENTS

| | | |
|---|---|---|
| FR | 3044886 A1 | 6/2017 |
| FR | 3054402 A1 | 1/2018 |

OTHER PUBLICATIONS

Robert Jaszczyk, "Mail Beacon—Make your mailbox SMART", Mar. 2, 2018, 7 pages.

* cited by examiner

FIG. 3

NOTIFYING AN INDIVIDUAL ABOUT AN ITEM IN A SECURE MAILBOX

CROSS-REFERENCE TO RELATED APPLICATIONS

This application claims the benefit of Indian Application No. 201811014440 filed Apr. 16, 2018, which is incorporated herein by reference in its entirety.

BACKGROUND

The subject matter disclosed herein generally relates to the field of access control systems, and more particularly to an apparatus and method for notifying an individual about an item in a secure mailbox.

Numerous packages and other mail are delivered by couriers to non-residential locations such as hotels and office buildings. Generally, a courier leaves the package with a representative of the hotel (or office building) to secure the package until it is picked up by the intended recipient. The representative can notify the intended recipient of the arrival of the package or it can be up to guests of the hotel (or office building occupants) to check their mailboxes periodically to see if they have any items. In the case of a hotel, the representative is often a hotel employee who works at the front desk or in security. In the case of an office building, the receiving and securing the item from the courier is often performed by a security guard or receptionist. Current methods of notifying intended recipients that items are waiting for them to pick up and for securing the items until they are picked up can be labor intensive.

BRIEF SUMMARY

According to an embodiment, a method of notifying an individual about an item in a secure mailbox is provided. The method includes receiving an indication that an item for an intended recipient has been deposited into a secure mailbox. The method also includes, based at least in part on receiving the indication, programming an access control device of the secure mailbox to unlock the access control device in response to a credential assigned to the intended recipient and notifying the intended recipient that the item is in the secure mailbox. It is detected that the secure mailbox has been unlocked in response to the credential that is assigned to the intended recipient. Based at least in part on the detecting, re-programming the access control device of the secure mailbox to an un-programed status that includes the access control device remaining in the unlocked state.

In addition to one or more of the features described above or below, or as an alternative, further embodiments of the method may include the re-programming including disassociating the credential from the secure mailbox.

In addition to one or more of the features described above or below, or as an alternative, further embodiments of the method may include the credential also being used by the intended recipient to unlock another access control device.

In addition to one or more of the features described above or below, or as an alternative, further embodiments of the method may include the credential being randomly generated and different from another credential used by the intended recipient to unlock another access control device.

In addition to one or more of the features described above or below, or as an alternative, further embodiments of the method may include the secure mailbox being located in a hotel, the intended recipient being a hotel guest, and the method further includes determining a room assigned to the intended recipient, wherein the credential is the credential used by the intended recipient to unlock an access control device to gain access to the room.

In addition to one or more of the features described above or below, or as an alternative, further embodiments of the method may include using a near field communication (NFC) tag to correlate the secure mailbox with the room assigned to the intended recipient.

In addition to one or more of the features described above or below, or as an alternative, further embodiments of the method may include sending the indication to a hotel employee.

In addition to one or more of the features described above or below, or as an alternative, further embodiments of the method may include the notifying including generating an alert in response to the intended recipient unlocking another access control device.

In addition to one or more of the features described above or below, or as an alternative, further embodiments of the method may include automating the programming and notifying.

In addition to one or more of the features described above or below, or as an alternative, further embodiments of the method may include automating the receiving and re-programming.

In addition to one or more of the features described above or below, or as an alternative, further embodiments of the method may include receiving an indication comprises detecting that a weight of the secure mailbox is over a threshold weight.

According to another embodiment, a system is configured to notify an individual about an item in a secure mailbox. The system includes a processor and a memory having computer-executable instructions that, when executed by the processor, cause the processor to perform operation. The operations include receiving an indication that an item for an intended recipient has been deposited into a secure mailbox. The method also includes, based at least in part on receiving the indication, programming an access control device of the secure mailbox to unlock the access control device in response to a credential assigned to the intended recipient and notifying the intended recipient that the item is in the secure mailbox. It is detected that the secure mailbox has been unlocked in response to the credential that is assigned to the intended recipient. Based at least in part on the detecting, re-programming the access control device of the secure mailbox to an un-programed status that includes the access control device remaining in the unlocked state.

In addition to one or more of the features described above or below, or as an alternative, further embodiments of the system may include the re-programming includes disassociating the credential from the secure mailbox.

In addition to one or more of the features described above or below, or as an alternative, further embodiments of the system may include the credential also being used by the intended recipient to unlock another access control device.

In addition to one or more of the features described above or below, or as an alternative, further embodiments of the system may include the credential being randomly generated and different from another credential used by the intended recipient to unlock another access control device.

In addition to one or more of the features described above or below, or as an alternative, further embodiments of the system may include the secure mailbox being located in a hotel, the intended recipient being a hotel guest, and the operations further include determining a room assigned to the intended recipient, wherein the credential is the credential used by the intended recipient to unlock an access control device to gain access to the room.

In addition to one or more of the features described above or below, or as an alternative, further embodiments of the system may include using a near field communication (NFC) tag to correlate the secure mailbox with the room assigned to the intended recipient.

In addition to one or more of the features described above or below, or as an alternative, further embodiments of the system may include sending the indication to a hotel employee.

In addition to one or more of the features described above or below, or as an alternative, further embodiments of the system may include the notifying including generating an alert in response to the intended recipient unlocking another access control device.

In addition to one or more of the features described above or below, or as an alternative, further embodiments of the system may include automating the programming and notifying.

Technical effects of embodiments of the present disclosure include the ability to provide a secure mailbox system with access credentials. Technical effects of embodiments of the present disclosure also include the ability to automatically notify a guest about an item, such as a letter or package, addressed to the guest and stored in a secure mailbox that the guest can unlock to retrieve the item.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In accordance with an embodiment, a system and method are provided to notify an individual about an item in a secure mailbox. The item, such as a letter or package, is stored in a secure mailbox and the individual who is the intended recipient of the item is notified. In addition, the intended recipient of the item is given access to open the secure mailbox based, for example on a security certificate previously assigned to the individual. The secure mailbox can include an access control device that is programmed to unlock upon detection of the certificate. Once unlocked, the individual can open the secure mailbox to access the item(s) contained in the secure mailbox. After the individual opens the secure mailbox, the access control device controlling access to the secure mailbox can be re-programmed to an un-programmed status so that the secure mailbox can be opened without a certificate. When a courier deposits a new item in the un-programmed secure mailbox, the secure mailbox can be programmed with a certificate of the individual who is the intended recipient of the new item.

Figure 1:
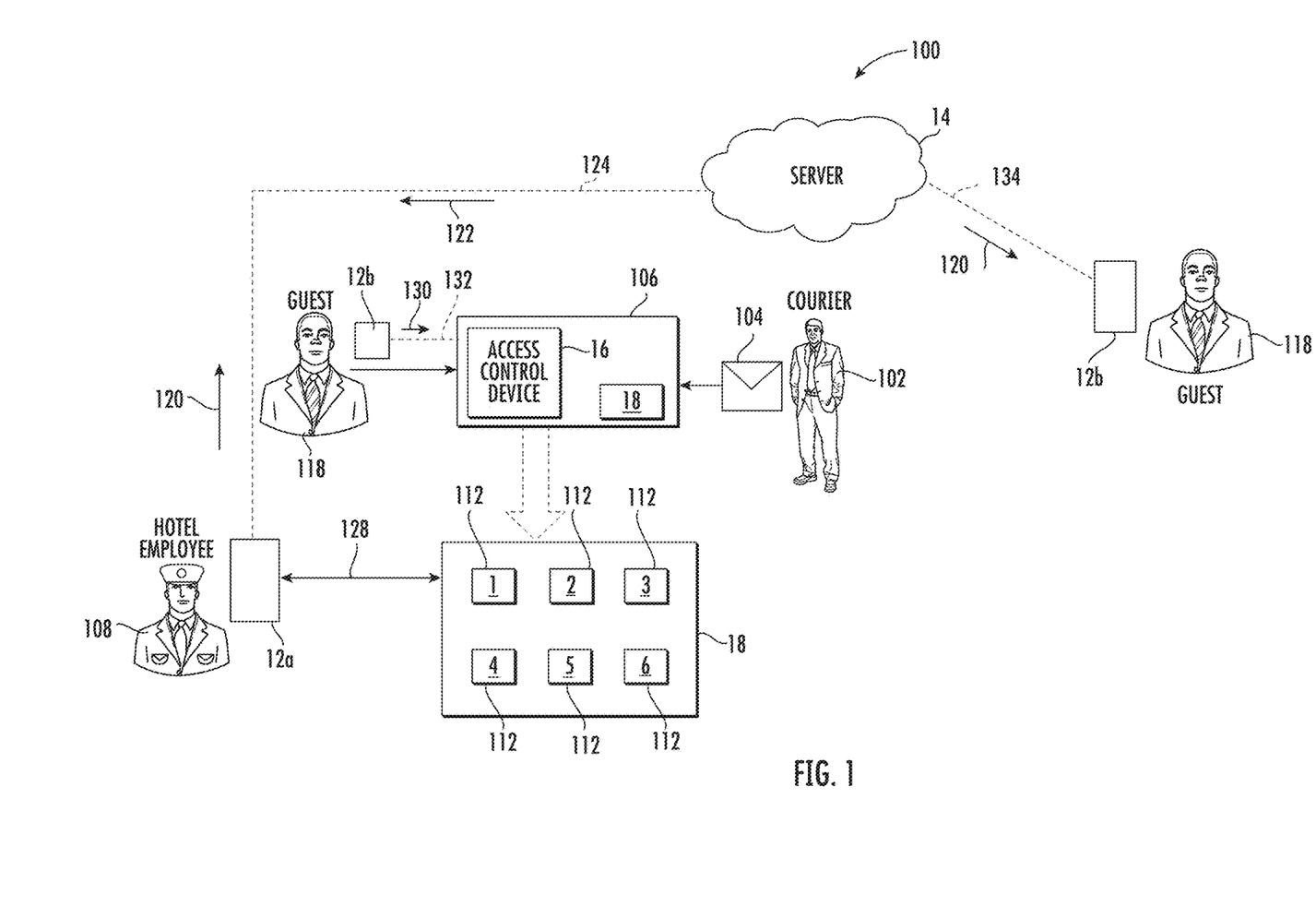
FIG. 1 illustrates a general schematic diagram of a system for notifying an individual about an item in a secure mailbox, in accordance with an embodiment of the disclosure.

Turning now to FIG. 1, a general schematic diagram of a system 100 for notifying an individual about an item in a secure mailbox is generally shown in accordance with an embodiment of the disclosure. The embodiment of the system 100 shown in FIG. 1 can be implemented, for example in a hotel where items for guests staying at the hotel are received from a courier. The system 100 of FIG. 1 includes an access control device 16 that controls access to secure mailbox 106. The secure mailbox 106 also includes customer box tags 18 that include near field communication (NFC) tags 112 corresponding to each of the rooms in the hotel. It should be appreciated that while one secure mailbox 106 and one access control device 16 are illustrated, the system may include any number of secure mailboxes 106 and access control devices 16. It should also be appreciate that by allowing the secure mailboxes 106 to be used for different guests at different points in time, that the number of secure mailboxes 106 can be less than the number of rooms in the hotel. This can result in cost savings to the hotel when compared to contemporary methods that often have a separate mailbox slot designated for each room.

The access control device 16 shown in FIG. 1 may be a wireless-capable, restricted-access, or restricted-use device such as a wireless lock, access control reader for building entry, and other restricted-use machine. The mobile device 12 submits credentials to the access control device 16, thereby selectively permitting a user to access or activate functions of the access control device 16. A mobile device 12 (or physical card key) may, for example, submit a credential to an electromechanical lock to unlock it, and thereby gain access to the secure mailbox 106 or to a room at the hotel.

The system 100 shown in FIG. 1 also includes a server 14 that includes instructions to manage and store credentials. Although the server 14 is depicted herein as a single device, it should be appreciated that the server 14 may alternatively be embodied as a multiplicity of systems, from which a mobile device 12 can receive credentials and other data. It should be appreciated that, although particular elements are separately defined in the schematic block diagram, each or any of the elements may be otherwise combined or separated via hardware and/or software.

In accordance with an embodiment, a courier 102 delivers an item 104 to the hotel. The item 104 can be, for example, a letter or package addressed to a guest at the hotel. The courier can be any person that delivers mail or other items to a guest at a hotel such as, but not limited to, a mail carrier from the United States Postal Service® and a FedEx® delivery person. The courier 102 deposits the item 104 into a box, such as secure mailbox 106. In an embodiment, the secure mailbox 106 selected by the courier 102 has a status of un-programmed which means that the access control device 16 is not activated and that the secure mailbox can be open by anyone (e.g., the courier 102) without any keys or key cards or credentials.

Once the item 104 is deposited in the secure mailbox by the courier and the courier closes the secure mailbox 106, the secure mailbox 106 (e.g., an access control device on the secure mailbox 106) can notify a hotel employee 108, such as a hotel security person, that an item 104 has been deposited. In an embodiment, a weight of the secure mailbox 106 is monitored and when the weight is over a programmable threshold weight (e.g., the threshold weight is more than the weight of the secure mailbox 106 when it is empty), then an indication, or notification, can be sent automatically to the hotel employee 108 indicating that an item 104 has been deposited in the secure mailbox 106. In an embodiment of the present invention, the notification can be sent to a mobile application executing on a mobile device 12a utilized by the hotel security person over a Bluetooth interface. Once the hotel employee 108 knows about the item 104 being deposited in the secure mailbox 106, the hotel employee 108 can identify the hotel room that the item 104 is associated with (e.g., the room where the intended recipient is staying).

The hotel guest 118 who is the intended recipient of the item 104 is notified that the item 104 has been delivered. In an embodiment, the hotel employee 108 taps, using mobile device 12a, a NFC tag 112 corresponding to the hotel room of the hotel guest 118. Mobile device 12a can be assigned to the hotel employee 108, or it could be a shared mobile device 12a used by hotel employees who work at the front desk of the hotel and/or perform security tasks for the hotel. The tapping of the NFC tag 112 can cause the mobile device 12 to send a push notification 120 to a mobile device 12b of the hotel guest 118 to communicate the arrival of the item to the hotel guest 118. In an embodiment, the push notification 120 has two portions, the first when it is sent via wireless communication interface 124 to the server 14, and the second when it is sent via wireless communication interface 134 to the mobile device 12b of the hotel guest 118. Wireless communication interfaces 124 and 134 may be implemented by any short or long-range wireless communication methods known in the art over networks such as, but not limited to the Internet, a local area network (LAN), and a wide area network (WAN). In an embodiment, the push notification 120 is sent directly to the mobile device 12b of the user via wireless communication interface 134.

In an embodiment, when the hotel guest is not using a mobile device 12b to access controlled areas of the hotel, and is instead using a key card and readers, the hotel guest may receive an alert when the key card is inserted into the card reader of the door of the room where the hotel guest 118 is staying. If the secure mailbox 106 is an online mail box (e.g., it is in communication with the server 14), then the secure mailbox 106 can inform the server 14 directly that the hotel guest should be given access to the secure mailbox 106. The server 14 can program the secure mailbox 106 using a credential(s) already assigned to the hotel guest to unlock an access control device on the hotel room assigned to the guest. Alternatively, the server 14 can generate a random credential, assign it to the hotel guest, and program the secure mailbox 106 using the random credential.

In an embodiment, where the hotel room locks, or access control devices, are offline, the server 14 can cause all of the hotel offline locks to form a network to inform all the messages at a time so that only the applicable lock with an address match will inform the guest of the item in the secure mailbox 106 by generating an alert when room lock is opened. In an embodiment, the network is a Bluetooth mesh.

The alert indicating that an item 104 (e.g. package) has arrived for the hotel guest 118 can take the form of, for example, an audio alert or a text message sent to the mobile device 12b of the hotel guest 118. In an embodiment, the alert is sent to the mobile device 12b using any short-range wireless communication method known in the art such as, but not limited to: Wi-Fi, Bluetooth, Zigbee, and infrared.

In addition to initiating a notification to the hotel guest 118, the tapping of the NFC tag 112 can also cause the mobile device 12a used by the hotel employee 108 to retrieve, from the server 14 via wireless communication interface 124, a credential 122 of the hotel guest 118. In an embodiment, the hotel guest 118 has a single credential that is used to unlock the door of the hotel room where the hotel guest 118 is staying. The credential 122 of the hotel guest 118 is programmed into the secure mailbox 106 and the secure mailbox 106 is locked to prevent anyone without the credential 122 from accessing the contents of the secure mailbox 106. In another embodiment, the hotel guest 118 has several credentials and one or more of the credentials are programmed into the secure mailbox 106. In a further embodiment, a new credential is created for the secure mailbox 106 and assigned to the hotel guest 118 by the server 14.

In an embodiment, the programming of the secure mailbox 106 is performed using NFC channel 128. In another embodiment, the programming of the secure mailbox is performed using a BTLE protocol. For example, tapping on a particular NFC tag 112 associated with a room can be performed using a NFC protocol. In another embodiment, instead of using NFC channel 128, a different short-range wireless communication interface, such as Bluetooth, is used to select the hotel room of the intended recipient of the item. Once a new credential is received by the server 14 the credential can be programmed into the secure mailbox 106 using Bluetooth to avoid the person who is programming or un-programming the secure mailbox 106 from having to physically go the secure mailbox 106. Bluetooth typically has some range of distance where NFC does not and NFC may require a person to go physically to tap the secure mailbox 106 to program or re-program the secure mailbox 106. In some embodiments the NFC protocol is used to program the secure mailbox 106 and in other embodiments a BLTE protocol is used to program the secure mailbox 106. In an embodiment, the NFC tags 112 are passive tags without intelligence and are used for requesting the server to notify the guest. In another embodiment, the NFC tags 112 are active tags that are also used to program the secure mailboxes 106.

When the hotel guest 118 retrieves the item by opening the secure mailbox using a credential 122, the state of the access control device 16 can be changed from locked to unlocked and optionally, changed to an un-programmed state. As shown in FIG. 1, this can be performed by an access request 130, containing the credential 122, from the mobile device 12b being sent to the access control device 16 of the secure mailbox 106 via a short-range wireless communication interface 132. The short-range wireless communication interface 132 can be implemented by any short-range wireless communication method known in the art such as, but not limited to: Wi-Fi, Bluetooth, Zigbee, and infrared. In an alternate embodiment a near field communication interface (NFC) is used instead of or in addition to the short-range wireless communication interface 132. In another embodiment, the hotel guest 118 uses a physical keycard that has been programed with the credential to unlock the access control device 16. In the case where the hotel guest 118 uses a physical keycard, the same credentials already programmed into the physical keycard (e.g., to provide access to a hotel room or to a parking garage) are typically used to open the secure mailbox 106. This can avoid the hotel guest 118 having to go the front desk to have their physical keycard re-programmed or to get a new physical key.

After the individual opens the secure mailbox and retrieves the item 104, the access control device 16 controlling access to the secure mailbox 106 can be re-programmed to an un-programmed status so that the secure mailbox 106 can remain unlocked and be opened without a certificate. This can allow the courier 102, or a different courier, to deposit a new item in the secure mailbox 106.

In an embodiment, the access control device 16 on the secure mailbox 106 advertises with a BTLE packet to notify mobile device 12a that the secure mailbox 106 is in an un-programmed status. In addition, as described previously, a weight of the secure mailbox 106 can be monitored and when the weight is over a programmable threshold weight (e.g., the threshold weight is more than the weight of the secure mailbox 106 when it is empty), then the secure mailbox 106 can advertise with a BTLE packet to notify the mobile device 12a that an item has been deposited in the secure mailbox 106.

Figure 2:
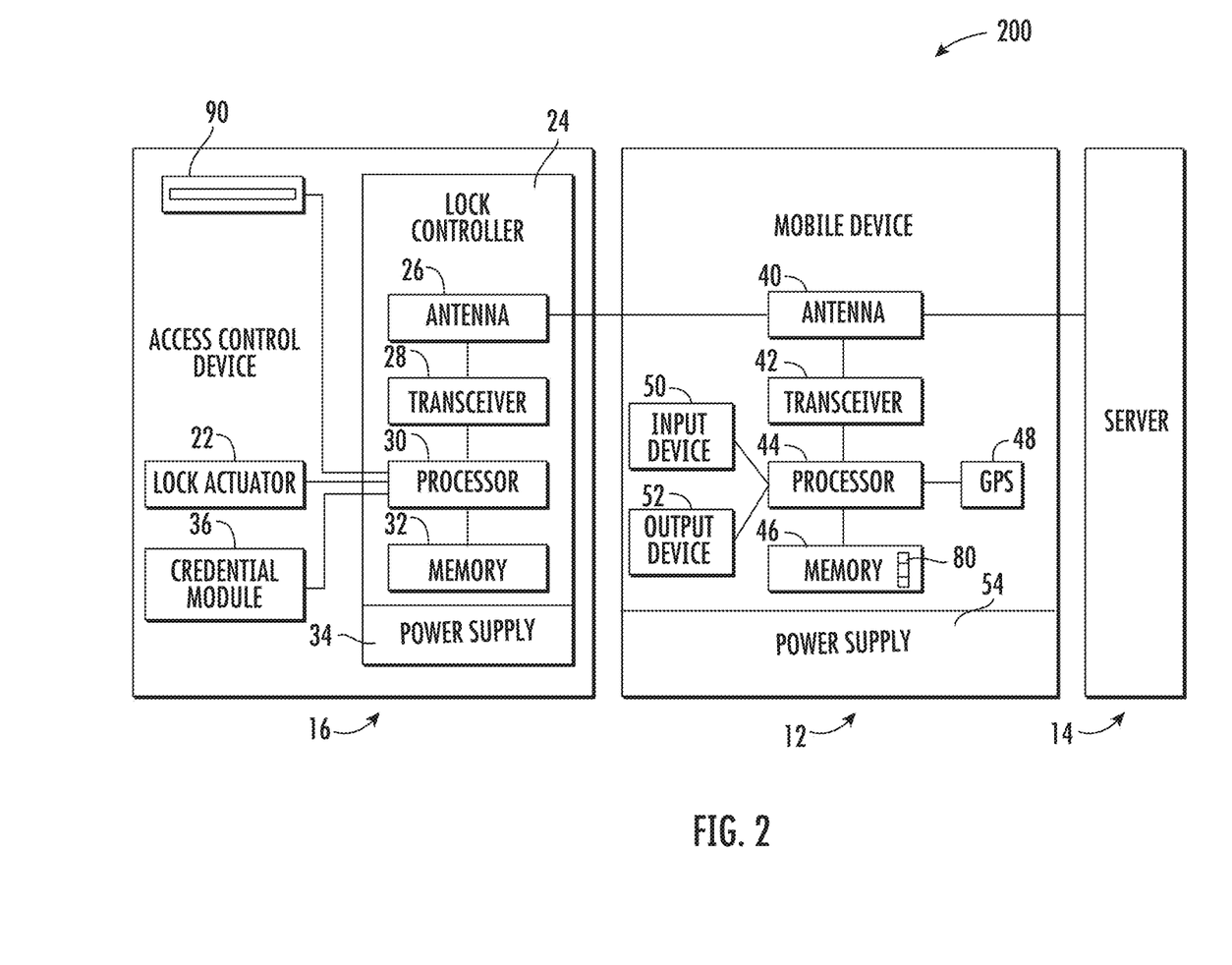
FIG. 2 illustrates a block diagram of an access control device, mobile device, and server of the access control system of FIG. 1, in accordance with an embodiment of the disclosure.

With reference to FIG. 2, a block diagram of an example electronic lock system 200 includes the access control device 16, the mobile device 12b of the hotel guest 118, and the server 14. The access control device 16 generally includes a lock actuator 22, a lock controller 24, a lock antenna 26, a lock transceiver 28, a lock processor 30, a lock memory 32, a lock power supply 34, a lock card reader 90 and a credential module 36. The access control device 16 may have essentially two readers, one lock card reader 90 to read a physical key card and the credential module 36 to communicate with the mobile device 12 via the lock processor 30 and the transceiver 28 and antenna 26. The access control device 16 is responsive to credentials from the mobile device 12, and may, for example, be the lock of a secure mailbox, a lock of a turnstile or a door lock. Although the present disclosure focuses primarily on credentials for access control, it should be appreciated that other systems wherein credentials are transmitted from a mobile device to an access control device so as to identify the user to an online system or validate user access rights or permissions in an offline system will benefit herefrom.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. In this manner, a lock state of the access control device 16 changes from one state to another state. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, infrared, Zigbee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options and the lock audit records. The lock audit records described herein may be a unified audit trail that includes events initiated by accessing the lock via a mobile device 12 or key card. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28. In an embodiment, the programming and re-programming of the secure mailbox described previously is performed at least in part, via the credential module 36.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna 26. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12.

Figure 3:
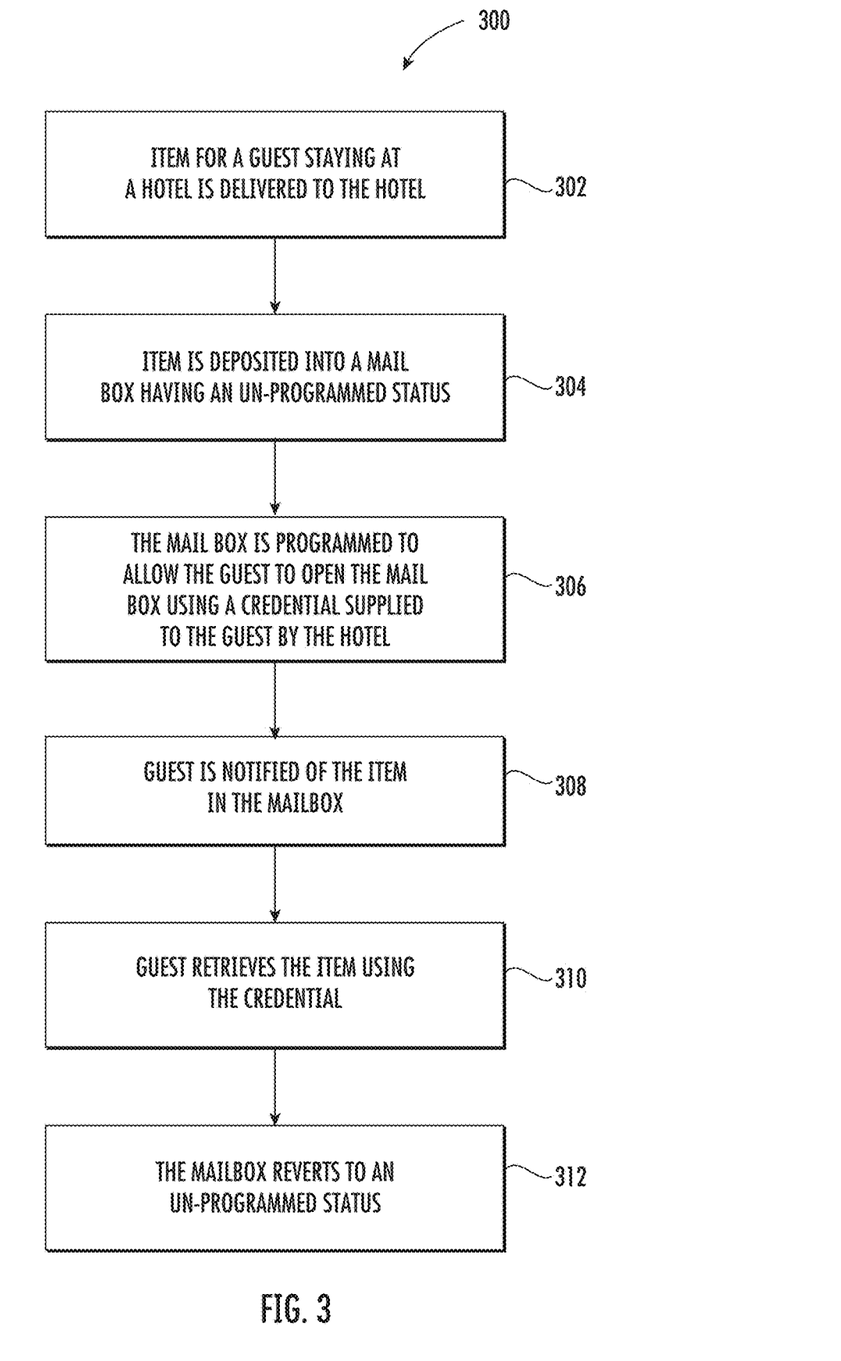
FIG. 3 is a flow diagram illustrating a method of notifying an individual about an item in a secure mailbox, in accordance with an embodiment of the disclosure.

Turning now to FIG. 3, a flow diagram 300 illustrating a method of notifying an individual about an item in a secure mailbox is generally shown, in accordance with an embodiment of the disclosure. At block 302 an item, such as item 104 of FIG. 1, is delivered to a hotel by a courier, such as courier 102 of FIG. 1. In an embodiment, the item is a letter or other package addressed to a guest staying at the hotel. At block 304, the item is put into a secure mailbox, such as mailbox 106 of FIG. 1, that is in an un-programmed (e.g., unlocked) status. In an embodiment, when the item is deposited in the secure mailbox, the access control device of the secure mailbox can detect that a door or other opening on the secure mailbox has been shut and can automatically notify an employee of the hotel that an item has been deposited in the secure mailbox. The employee can be notified for example, by sending an alert from the secure mailbox to a mobile device utilized by the employee.

At block 306, an employee of the hotel initiates the retrieval of credential(s) associated with the guest and/or with the room where the guest is staying. The retrieved credentials associated with the hotel guest are programmed into an access control device, such as access control device 16 of FIG. 1, of the secure mailbox containing the item. In an embodiment, a credential used by the guest to open a door of a room where the guest is staying is programmed to open the access control device of the secure mailbox. In another embodiment, a new credential is randomly generated and associated with the guest. The new credential is programmed to open the access control device of the secure mailbox.

At block 308 of FIG. 3, the hotel guest who is the intended recipient of the item is notified that the item has arrived at the hotel. The notification can be via a push notification from a server, such as server 14 of FIG. 1, to a mobile device of the hotel guest. In an embodiment, the push notification is sent immediately upon detecting the item in the secure mailbox. In another embodiment, the push notification is not sent to the mobile device of the hotel guest until the mobile device of the hotel guest is detected at a selected location(s) on the hotel property, such as the parking garage or lobby. In an alternate embodiment, the guest is notified via an alert that is generated when the hotel guest unlocks the access control device, or lock, on the door of the hotel room where the guest is staying.

At block 310, the hotel guest opens the secure mailbox using the associated credentials, and at block 312, the secure mailbox reverts (e.g., is re-programmed) to an un-programmed status. The re-programming can be initiated automatically, for example by the access control device located on the secure mailbox, in response to detecting that the access control device has been unlocked using the credential. This provides a one-time use secure mailbox for hotel guests. The re-programming of the access control device results in the secure mailbox remaining in an unlocked state until the access control device is programmed to accept a new credential. In addition, the re-programming can disassociate the credential of the intended recipient from the access control device, thereby disabling the credential from being able to open the secure mailbox.

In an embodiment, all or portions of the processing described in reference to FIG. 3 can be automated. For example, in an embodiment, when a secure mailbox that has a status of un-programmed is opened by a courier, an item is inserted into the secure mailbox, and a door on the secure mailbox in closed, the application executing on the mobile device of the hotel employee can be automatically notified. In an embodiment, the courier can indicate a room number of the intended recipient (e.g., using NFC tags) and the system can automatically request credentials associated with the intended recipient from the server and program the secure mailbox automatically (e.g., using Bluetooth).

While the above description has described the flow process of FIG. 3 in a particular order, it should be appreciated that unless otherwise specifically required in the attached claims that the ordering of the steps may be varied.

While embodiments have been described herein in terms of a hotel, it will be appreciated that embodiments can be utilized in any environment where people regularly receive items from a courier such as, but not limited to office spaces or campus dormitories.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of notifying individuals about items in secure mailboxes, the method comprising:
    receiving an indication that an item for an intended recipient has been deposited into a secure mailbox;
    based at least in part on receiving the indication:
        programming an access control device of the secure mailbox to unlock the access control device in response to a credential assigned to the intended recipient, wherein the credential is also used by the intended recipient to unlock a door; and
        notifying the intended recipient that the item is in the secure mailbox;
    detecting that the access control device of the secure mailbox has been unlocked in response to the credential that is assigned to the intended recipient; and
    based at least in part on the detecting, re-programming the access control device of the secure mailbox to an un-programed status that includes the access control device remaining in the unlocked state,
    wherein the secure mailbox is located in a hotel, the intended recipient is a hotel guest, and the method further comprises determining a room assigned to the intended recipient, wherein the credential is the credential used by the intended recipient to unlock the door to gain access to the room.

2. The method of claim 1, wherein the re-programming includes disassociating the credential from the secure mailbox.

3. The method of claim 1, wherein the credential is also used by the intended recipient to unlock another access control device.

4. The method of claim 1, wherein a near field communication (NFC) tag is used to correlate the secure mailbox with the room assigned to the intended recipient.

5. The method of claim 1, wherein the indication is sent to a hotel employee.

6. The method of claim 1, wherein the notifying includes generating an alert in response to the intended recipient unlocking the door.

7. The method of claim 1, wherein the programming and notifying are automated.

8. The method of claim 7, wherein the receiving and re-programming are automated.

9. The method of claim 1, wherein the receiving an indication comprises detecting that a weight of the secure mailbox is over a threshold weight.

10. A system configured to notifying individuals about items in secure mailboxes, the system comprising:
a processor; and
a memory comprising computer-executable instructions that, when executed by the processor, cause the processor to perform operations, the operations comprising:
receiving an indication that an item for an intended recipient has been deposited into a secure mailbox;
based at least in part on receiving the indication:
programming an access control device of the secure mailbox to unlock the access control device in response to a credential assigned to the intended recipient, wherein the credential is also used by the intended recipient to unlock a door; and
notifying the intended recipient that the item is in the secure mailbox;
detecting that the access control device of the secure mailbox has been unlocked in response to the credential that is assigned to the intended recipient; and
based at least in part on the detecting, re-programming the access control device of the secure mailbox to an un-programed status that includes the access control device remaining in the unlocked state,
wherein the secure mailbox is located in a hotel, the intended recipient is a hotel guest, and the operations further comprises determining a room assigned to the intended recipient, wherein the credential is the credential used by the intended recipient to unlock the door to gain access to the room.

11. The system of claim 10, wherein the re-programming includes disassociating the credential from the secure mailbox.

12. The system of claim 10, wherein the credential is also used by the intended recipient to unlock another access control device.

13. The system of claim 10, wherein a near field communication (NFC) tag is used to correlate the secure mailbox with the room assigned to the intended recipient.

14. The system of claim 10, wherein the indication is sent to a hotel employee.

15. The system of claim 10, wherein the notifying includes generating an alert in response to the intended recipient unlocking the door.

16. The system of claim 10, wherein the programming and notifying are automated.

* * * * *